United States Patent [19]

Obuchi et al.

[11] Patent Number: 5,303,082
[45] Date of Patent: Apr. 12, 1994

[54] STEREOMICROSCOPE INCLUDING TWO PAIR OF POLARIZERS AND A QUARTER WAVELENGTH PLATE

[75] Inventors: Hideki Obuchi, Yokohama; Akira Watanabe, Hachiouji; Shinichi Dosaka, Kanagawa, all of Japan

[73] Assignee: Olympus Optical Co., Ltd., Tokyo, Japan

[21] Appl. No.: 860,424

[22] Filed: Mar. 30, 1992

[30] Foreign Application Priority Data

Feb. 28, 1991 [JP] Japan .................. 3-064742

[51] Int. Cl.$^5$ ............ G02B 21/22; G02B 21/36; G02B 21/06
[52] U.S. Cl. .................. 359/371; 359/386; 359/377
[58] Field of Search ............ 359/371, 386, 377, 376, 359/363

[56] References Cited

U.S. PATENT DOCUMENTS

| | | | |
|---|---|---|---|
| 3,405,990 | 10/1988 | Nathnagle et al. | 359/386 |
| 4,763,968 | 8/1988 | Minami et al. | 359/386 |
| 4,802,749 | 2/1989 | Togino et al. | 359/377 |
| 5,052,789 | 10/1991 | Kleinberg | 359/377 |

FOREIGN PATENT DOCUMENTS 55-113014 9/1980 Japan .
113614 9/1980 Japan .................. 359/377
60-227214 9/1980 Japan .

*Primary Examiner*—Jon W. Henry
*Attorney, Agent, or Firm*—Cushman, Darby & Cushman

[57] ABSTRACT

A stereomicroscope comprising a pair of observation systems each comprising an objective lens and an eyepiece lens, a pair of light sources disposed above the objective lens for emitting a pair of light beams through a pair of beam splitters into the observation systems coaxially therewith, pairs of polarizers disposed on the side of the eyepiece lenses and the side of the light sources respectively so as to have polarizing surfaces perpendicular to each other, a quarter wavelength plate interposed between the objective lens and a sample to be observed, and a pair of light beam deflecting members disposed between the beam splitters and the objective lens. The polarizers disposed on the side of the eyepiece lenses are removable from optical paths and eyepiece tubes are arranged with the polarizers disposed on the side of the eyepiece lenses interposed between the eyepiece tubes and an intermediate tube containing the pair of light beam deflecting members and the polarizers disposed on the side of the eyepiece lenses. This stereomicroscope permits locating eye points thereof at low positions close to microscopists and quickly switching microscopic modes from one to another.

14 Claims, 10 Drawing Sheets

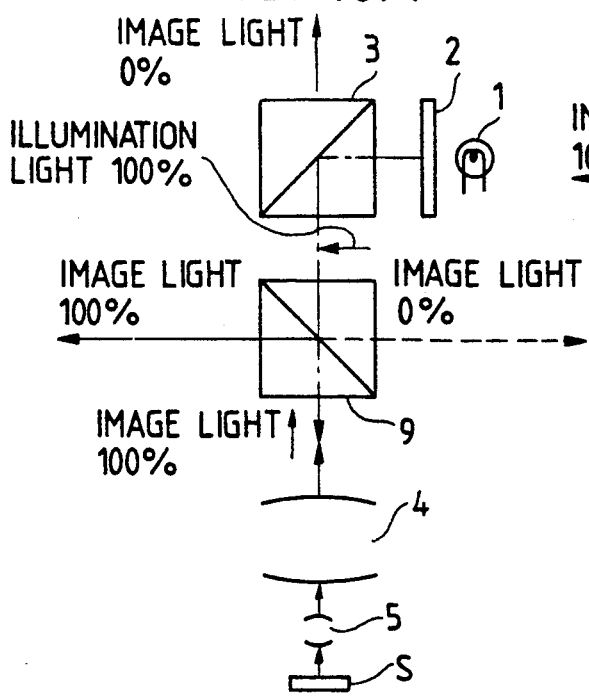
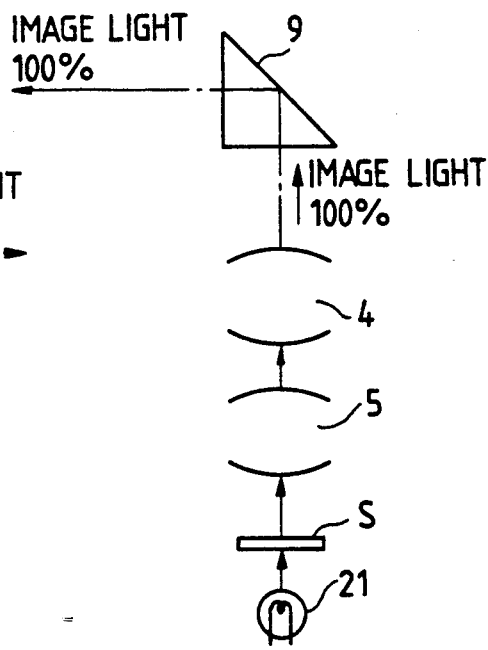
FIG. 10A
FIG. 10B
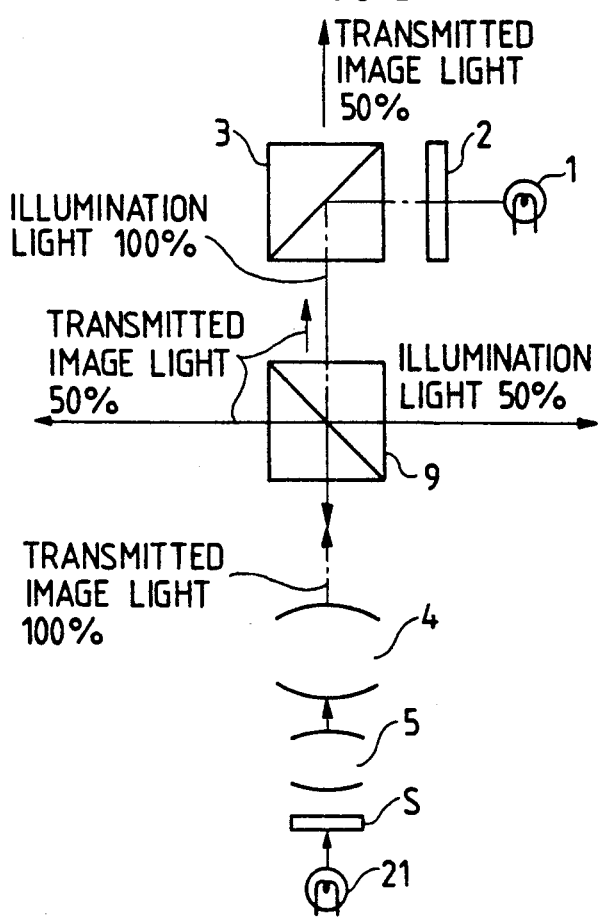
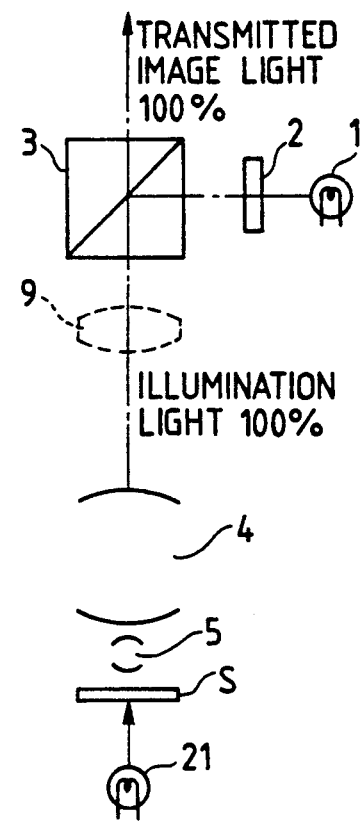
FIG. 10C
FIG. 10D

FIG. 11
FIG. 12
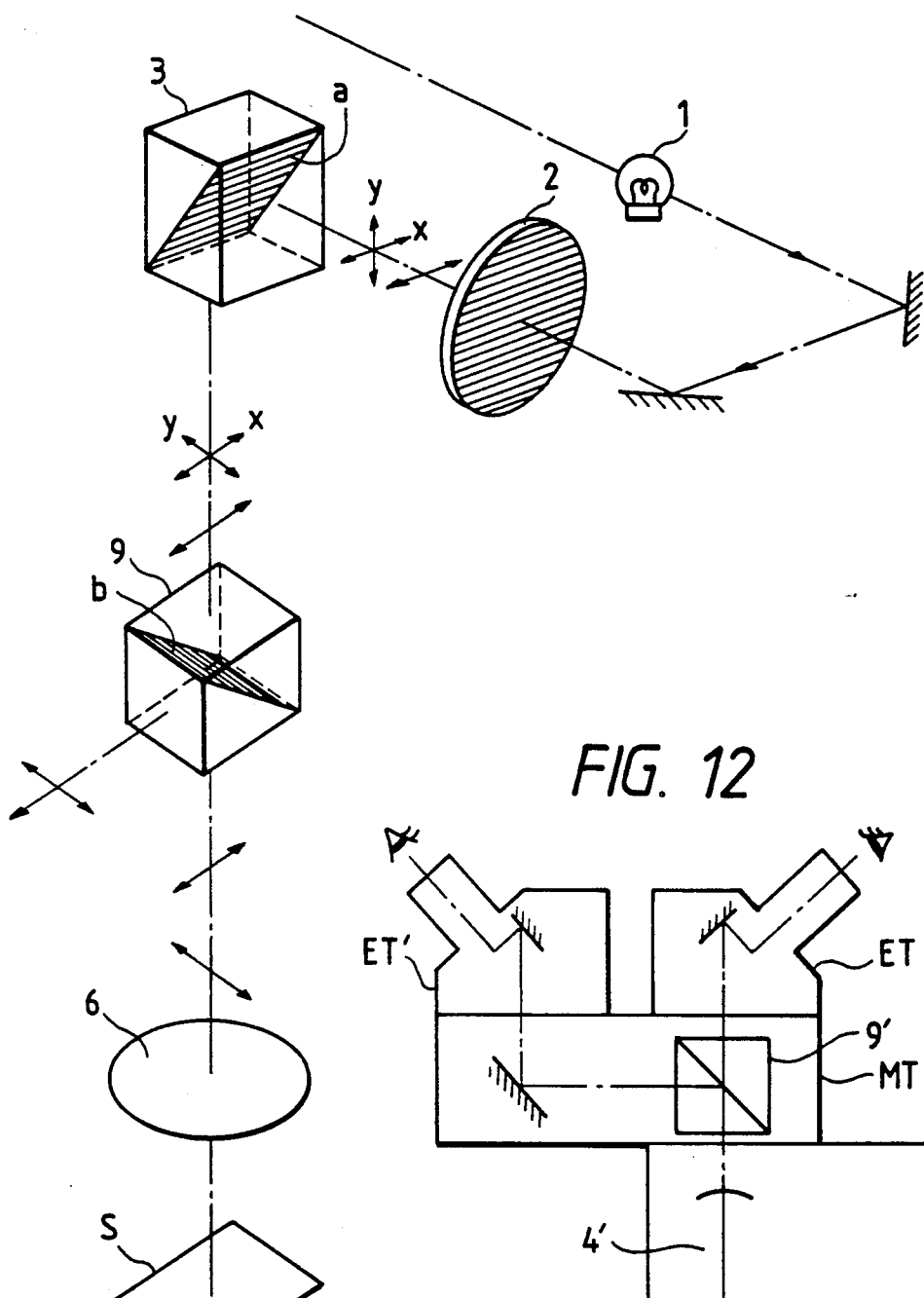
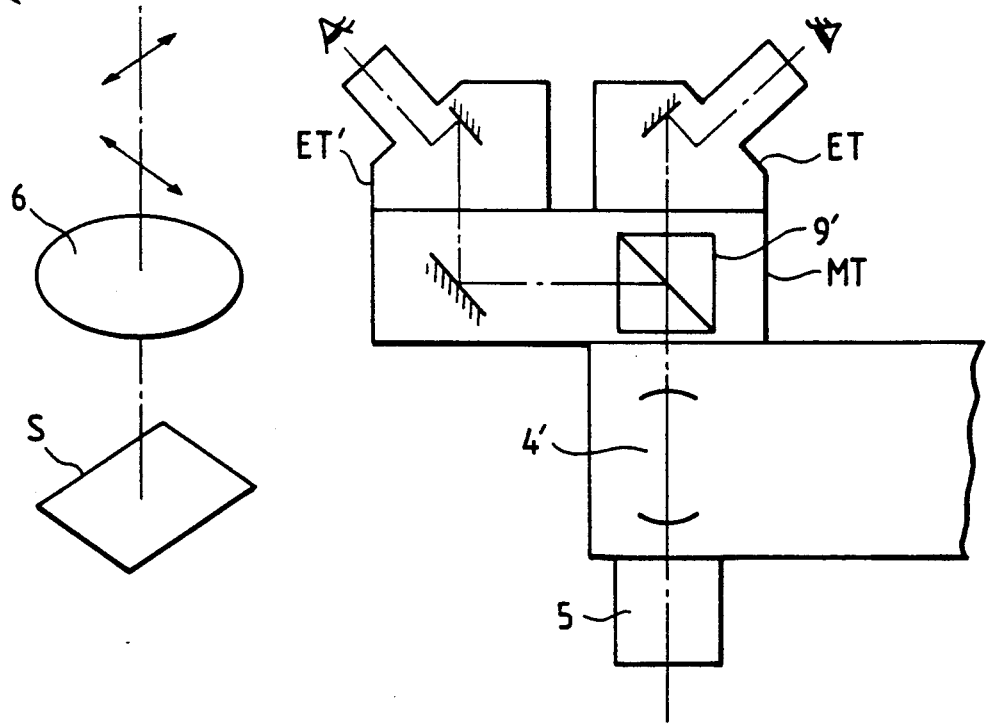

STEREOMICROSCOPE INCLUDING TWO PAIR OF POLARIZERS AND A QUARTER WAVELENGTH PLATE

BACKGROUND OF THE INVENTION a) Field of the invention

The present invention relates to an optical microscope, and more specifically to a highly systemized stereomicroscope.

b) Description of the prior art

There are available conventional most systemized high performance stereomicroscopes which are exemplified by the microscope disclosed by Japanese Patent Preliminary Publication No. Sho 55-113014 (hereinafter referred to as prior art No. 1) and that disclosed by Japanese Patent Preliminary Publication No. Sho 60-227214 (hereinafter referred to as prior art No. 2).

FIG. 1 illustrates an optical system of the microscope according to prior art No. 1, wherein a light beam emitted from a light source 1 of a first optical system I is linearly polarized by a polarizer 2, reflected by a polarizing beam splitter 3 which functions to reflect light in a polarizing direction thereof and allow light in a direction perpendicular to the polarizing direction to pass therethrough, and allowed to transmit through a variable magnification system 4 and an objective lens 5, whereafter the light beam is circularly polarized by a quarter wavelength plate 6 and illuminates a sample S. The circularly polarized light beam is reflected by the sample S, linearly polarized by the quarter wavelength plate 6 in the direction perpendicular to the polarized direction at the stage of the illumination, and allowed to pass through the objective lens 5 and another variable magnification system 4' of a second optical system II, whereafter the light beam attains to another beam splitter 3'. This polarizing beam splitter 3' is oriented in the same direction as that of the polarizing beam splitter 3 of the first optical system I so that the reflected light beam is allowed to transmit through the polarizing beam splitter 3' of the second optical system II and attains to an analyzer 7'. Since this analyzer 7' is oriented so that it allows to pass the linearly polarized light beam incident thereon, the reflected light beam which has passed through the analyzer 7' of the second optical system II is imaged by an eyepiece lens system 8' and can be observed therethrough.

A light beam emitted from a light source 1' of the second optical system II is, like the light beam emitted from the light source 1 of the first optical system I, imaged by an eyepiece lens 8 disposed in the first optical system I.

On the other hand, a polarizer 2' is oriented in the second optical system II in the same direction as that of the polarizer 2 of the first optical system so that rays which are reflected by the surfaces of the variable magnification system 4' of the second optical system II, the objective lens and so on, out of linearly polarized rays emitted from a light source 1' of the second optical system II and allowed to transmit through the polarizer 2' of the second optical system II, are perpendicular to the oscillating direction of the analyzer 7' of the second optical system II, whereby a light beam emitted from the light source 1' of the second optical system II is cut off by the polarizing beam splitter 3' and the analyzer 7' of the second optical system, and cannot attain to an image surface of the second optical system II. Since the analyzer 7 of the first optical system I functions to cut off rays reflected by lens surfaces, the microscope according to the prior art No. 1 provides an image which is to be observed with high contrast.

Further, in a stereomicroscope according to the prior art No. 2 which comprises the Gallelian optical system described above and a coaxial vertical illumination system, the quarter wavelength plate 6, the objective lens system 5, the variable magnification systems 4 and 4', a coaxial vertical illumination system EI (1, 2, 3, 7; 1', 2', 3', 7'), a photographing system PH, the eyepiece lens systems 8 and 8', and an intermediate tube allowing simultaneous observation by two microscopists are designed as independent units respectively as illustrated in FIG. 2 for permitting optional combinations of these units in conjunction with microscopy modes desired by users and enhancement in operability as well as convenience of the combinations.

In the conventional stereomicroscope described above, the coaxial vertical illumination unit is placed right over the objective lens system including the variable magnification systems (on the side of the eyepiece lens systems), the photographing unit and the simultaneous microscopy unit are set on the coaxial vertical illumination unit, and the eyepiece lens units including imaging systems are arranged on the simultaneous microscopy unit and the photographing unit. This configuration provides, first of all, a merit to assure a smaller loss of quantity of axial vertical illumination light. In other words, this configuration makes it possible to allow almost all of the rays which are reflected by the beam splitters 3 and 3' to transmit through the variable magnification systems 4, 4' and the objective lens unit 5 for illuminating a sample S. Further, since the objective lens unit 5 (including the variable magnification systems 4, 4') is located right under the coaxial vertical illumination unit, rays reflected by the lens surfaces are cut off effectively by the polarizers built in the beam splitters. Accordingly, it is unnecessary to arrange a reflected light cut-off filter in any one of the units located over the polarizers. Consequently, it is possible to use an observation unit for a transmission illumination mode with no additional device or obtain a highly systemized stereomicroscope.

When the intermediate tube, the photographing unit, etc. are piled over the coaxial vertical illumination unit, however, the conventional stereomicroscope poses a problem that an eye point EP is made higher than required as illustrated in FIG. 3A. In order to solve this problem, it was obliged to prepare a special tube which has an optical path modified so as to direct an afocal light beam coming from the objective lens system 5 downward as illustrated in FIG. 3B for obtaining an eye point located at a predetermined height. In FIG. 3A illustrating an example of a configuration of the ordinary type eyepiece tube, the reference symbol a represents a distance in the horizontal direction as measured from an optical axis to the eye point EP and the reference symbol b designates a distance in the vertical direction as measured from a base plane BP of the eyepiece tube unit to the eye point EP. Further, since the eyepiece tube unit uses an imaging lens IL which has a focal length shorter than the infinite focal length of the ordinary type objective lens system for microscopes, the eye point EP is inevitably located close to the optical axis of the objective lens system 5, thereby posing a problem that a microscopist must assume an unnatural posture (incline an upper half of his body forward)

when the stereomicroscope has a large sample stage. In industries of LC's and LCD's wherein large wafers, liquid crystal panels and so on are manufactured in these days, for example, a stereomicroscope incorporating a large sample stage prolongs the distance a as indicated by a reference symbol a' in FIG. 4B and produces great inconvenience for inspectors of the IC's and LSD's. Since the coaxial vertical illumination unit is disposed right over the variable magnification units 4, 4' and the objective lens unit 5 in the configuration of the stereomicroscope described above, location of the eye point EP is enhanced and operability of the stereomicroscope is remarkably degraded when the microscope system is complicated by piling the photographing unit and the eyepiece tube unit over the coaxial vertical illumination unit.

Furthermore, since the coaxial vertical illumination unit prolongs the optical path length in the stereomicroscope, the afocal light beam coming from the objective lens system is expanded especially when the intermediate tube is interposed for photographing. Accordingly, it was conventionally obliged to prepare imaging lenses IL having a large diameter and use a large prism in the eyepiece tube unit or reduce a real field number on an intermediate image surface for observation. In this case, it is general to cut off rays to attain to marginal portions of a visual field and expand light beams to attain to central portions of the visual fields, or to perform contraction and relaying of a light beam by disposing relay lenses RL before and after the beam splitters 3, 3' arranged in the coaxial vertical illumination unit (see FIG. 5). However, this contraction-relaying method magnifies causes magnification of intermediate image, thereby producing inconvenience that an image is observed at different magnifications even with the same eyepiece tube dependently on whether or not the coaxial vertical illumination is used.

Moreover, when the coaxial vertical illumination mode is switched to the transmission illumination mode while the stereomicroscope is equipped with coaxial vertical illumination unit, there are posed problems that a quantity of the transmitted illumination light for forming an image is reduced to approximately 30% by the beam splitters 3, 3' and analyzers 7, 7' arranged in the first optical system I and the second optical system II respectively, and that flare unwanted for observation is produced by the beam splitters and the analyzers. When the illumination modes are switched as described above, the real field number in the transmission illumination mode restricts that on the side of the coaxial vertical illumination unit, thereby making it impossible to fully utilize the visual field of the stereomicroscope which should originally be large.

Moreover, it is theoretically possible with ease to observe an image formed with a transmitted polarized light beam through the stereomicroscope which is equipped with the coaxial vertical illumination unit by removing the quarter wavelength plate and setting a polarizer instead on the light source side of the sample S, but it is practically necessary for such observation to set the polarizing planes of the analyzers 7, 7' arranged in the coaxial vertical illumination unit accurately perpendicularly to the oscillating direction of the incident light beam. In addition, it is difficult to observe a correct image since polarized light produced by the sample S is further polarized due to shaping and assembling errors as well as internal deformation, radii of curvature, etc. of the objective lens 5 and the variable magnification lens 4. In such a case, it is obliged to arrange an analyzer in place of the quarter wavelength plate in the objective lens system 5 after dismounting the coaxial vertical illumination unit, thereby making it practically impossible to perform the so-called quick switching between the transmission-polarization illumination mode and the coaxial vertical illumination mode.

SUMMARY OF THE INVENTION

In view of the problems in the current circumstance, it is a primary object of the present invention to provide a stereomicroscope which is capable of setting an eye point at a low height close to a microscopist and allowing quick exchange of optical members required for changes of microscopic modes.

The stereomicroscope according to the present invention comprises: a pair of observation systems which are the same in optical composition, and comprise a common objective lens and a pair of eyepiece lenses; a pair of light source means which are arranged above the objective lens and transmit illumination light beams through beam splitters so as to be coaxial with the observation system; polarizers which are disposed on the side of the eyepiece lenses and on the side of the light sources, and have oscillating directions perpendicular to each other; and a quarter wavelength plate disposed between the objective lens and a sample to be observed; light beam deflector means which can be interposed selectively between the beam splitters and the objective lens; and polarizers which are removably interposed in optical paths deflected by the light beam deflector means. Eyepiece tubes are arranged with the polarizers interposed between the eyepiece tubes and an intermediate tube containing the light beam deflecting means and the polarizers disposed on the side of the eyepiece lenses.

The stereomicroscope according to the present invention, which comprises the light beam deflecting means disposed between the objective lens and the beam splitters, allows images to be transmitted to the eyepiece lenses from between a coaxial vertical illumination unit and variable magnification units in directions perpendicular to an optical axis of the objective lens. Accordingly, the stereomicroscope according to the present invention permits prolonging a distance as measured in the horizontal direction from the optical axis to an eye point and shortening a distance as measured in the vertical direction from the optical axis to the eye point, thereby facilitating observing works by correcting the defect of the conventional stereomicroscope that it obliges a microscopist to assume an unnatural posture when the microscope is equipped with a large sample stage.

The stereomicroscope according to the present invention is capable of keeping location of the eye point constant even when it is equipped with an additional unit such as a photographing unit. Further, the stereomicoscope according to the present invention does not allow magnification thereof to be changed by combining or not the coaxial vertical illumination unit with the eyepiece tubes, thereby preventing the microscopist from mistaking selected observing magnifications. Furthermore, the stereomicroscope according to the present invention permits quick switching among observation in the coaxial vertical illumination mode, observation in the transmission illumination mode and observation in a transmission-polarization mode, and assures adequate performance of stereomicroscope with respect to light quantity, systematization and so on.

This and other objects as well as the features and the advantages of the present invention will become apparent from the following detailed description of the preferred embodiments made in conjunction with the accompanying drawings.

BRIEF DESCRIPTION OF THE DRAWINGS

FIG. 10A is a sectional view illustrating an example of system configuration of the stereomicroscope according to the present invention when it comprises polarizing beam splitters which are disposed in a group of the light beam deflector means;

FIG. 10B is a sectional view illustrating an example of system configuration of the stereomicroscope according to the present invention when it comprises mirrors which are disposed in the group of the light beam deflector means;

FIG. 10C is a sectional view illustrating an example of system configuration of the stereomicroscope according to the present invention when it comprises half mirrors which are disposed in the group of the light beam deflector means;

FIG. 10D is a sectional view illustrating an example of system configuration of the stereomicroscope according to the present invention when it comprises empty holes which are disposed in the group of the optical path switching means;

FIG. 11 is a perspective view illustrating the main members of the stereomicroscope according to the present invention for description of processes of forming an optical path in the system configuration shown in FIG. 10A;

FIG. 12 is a sectional view illustrating an example of system configuration of the stereomicroscope according to the present invention when the universal intermediate tube is equipped with two eyepiece tube units;

DESCRIPTION OF THE PREFERRED EMBODIMENTS

Figure 1:
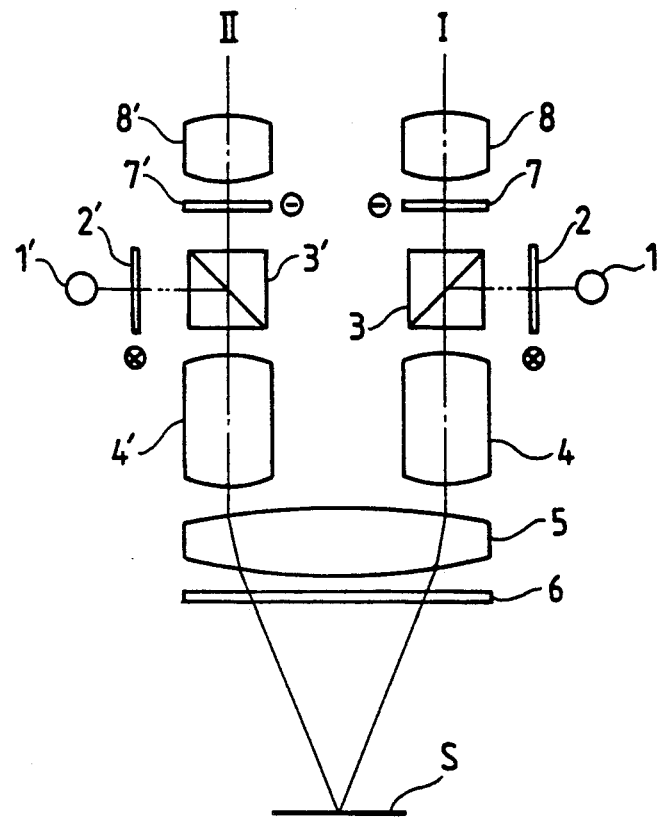
FIG. 1 is a sectional view illustrating an example of configuration of the conventional stereomicroscope comprising vertical illumination systems.

Now, the stereomicroscope according to the present invention will be described more detailedly below with reference to the preferred embodiments illustrated in the accompanying drawings. In the description that follows, members which are the same or similar to those represented by the reference numerals and reference symbols in the prior art No. 1 and No. 2 will be designated by the same reference numerals.

Figure 6:
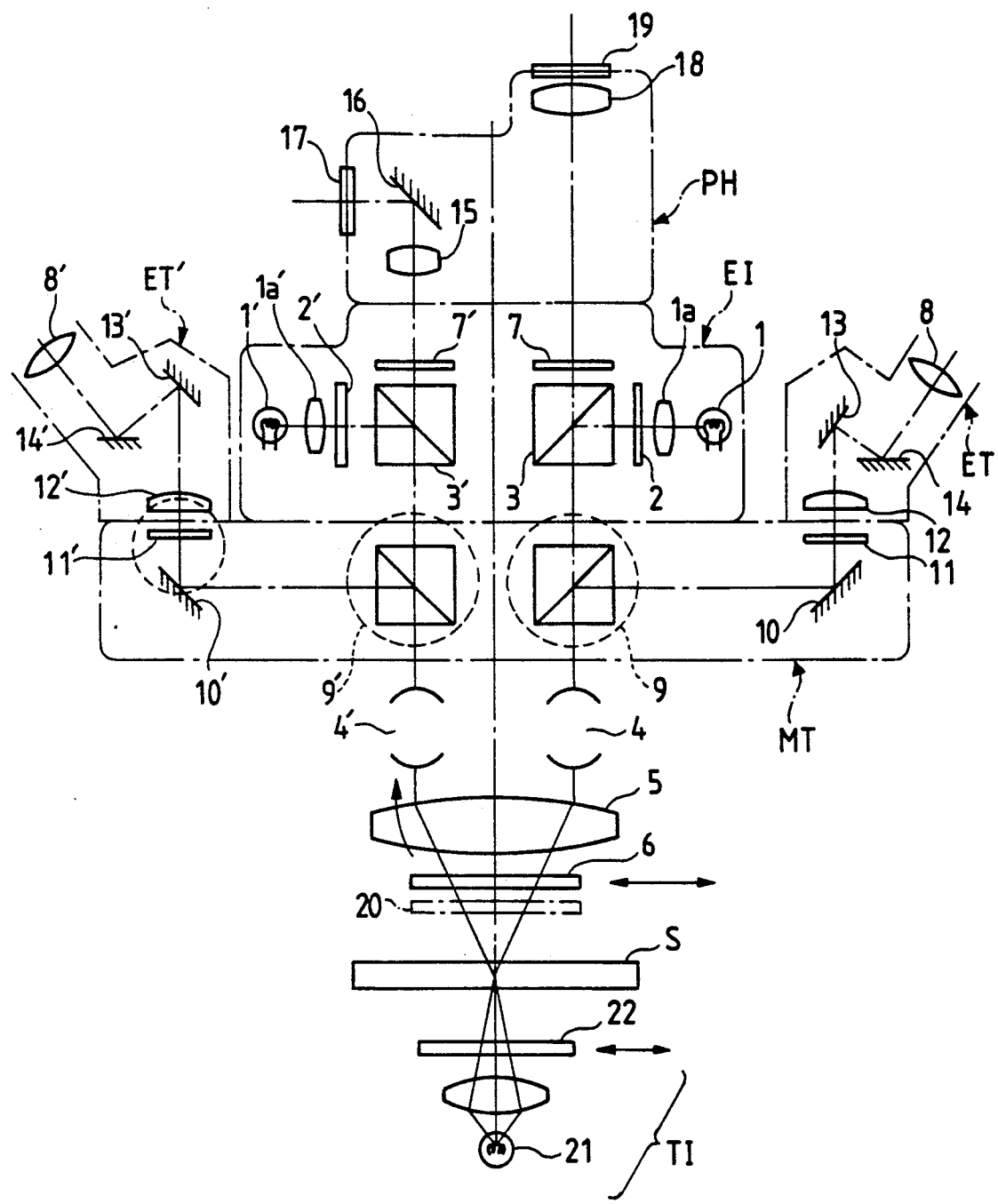
FIG. 6 is a sectional view illustrating an overall system configuration of an embodiment of the stereomicroscope according to the present invention.

In the stereomicroscope according to the present invention, a universal intermediate tube MT is disposed between a coaxial vertical illumination unit EI and an objective unit consisting of variable magnification lens systems 4, 4' and an objective lens 5 as shown in FIG. 6. The coaxial vertical illumination unit EI comprises light sources 1, 1', projector lenses 1a, 1a', polarizers 2, 2', beam splitters 3, 3' consisting of a polarizing beam splitters and half mirrors, and analyzers 7, 7'. A combination of the beam splitter 3 and the analyzer 7, and a combination of the beam splitter 3' and the analyzer 7' are disposed in a pair of optical paths which contain variable magnification lens systems 4, 4' for changing magnification of an image formed by the objective lens 5 and function to transmit images to imaging lenses to be described later. The polarizers 2, 2' have polarizing directions perpendicular to those of the analyzers 7, 7'. The universal intermediate tube unit MT comprises optical path switching means 9, 9' and polarizers 11, 11' removably disposed in optical paths provided for leading light beams, which have been reflected by a sample S and deflected by the optical path switching means 9, 9' and mirrors 10 and 10', to the eyepiece tube units ET and ET' respectively. The polarizers 11, 11' have polarizing directions which are perpendicular to those of the polarizers 2, 2' respectively and in parallel with those of the analyzers 7, 7'. Further, the optical path switching means 9, 9' are half mirrors, polarizing beam splitters, mirrors or empty holes which can be interposed selectively in the optical paths. The eyepiece tube units ET, ET' comprise imaging lenses 12, 12', a pair of mirrors 13, 14; 13', 14', and eyepiece lenses 8, 8' for bending the optical paths.

A pair of observation systems are disposed between the objective lens 5 and eyepiece lenses 8, 8'.

A pair of observation systems which have the same optical composition are disposed between the objective lens 5 and eyepiece lenses 8, 8' as described above. Arranged over the coaxial vertical illumination unit EI are a pair of optical paths, one of which comprises a TV optical system consisting of a TV lens 15, a mirror 16, a photo-adapter 17, etc. arranged on an optical axis thereof (optical axis of a second optical system II) and the other of which comprises another TV optical system consisting of a photographic lens 18, a photo-adapter 19, etc. arranged on an optical axis thereof (optical axis of a first optical system I). The TV optical system and the photographic optical system compose a TV photo-unit PH. In addition, a quarter wavelength plate 6 and an analyzer 20 are disposed removably between a sample S to be observed and the objective lens 5.

Further, attached to a stage (not shown) for mounting an fixing the sample S is a light source 21 for illumination in the transmission mode and a polarizer 22 is removably disposed in the vicinity of the sample S on the side of the light source 21 for the transmission illumination mode so as to compose a transmission illumination unit TI. This illumination unit TI is used for illumination in the transmission mode when it is selected in place of the coaxial vertical illumination unit.

Figure 2:
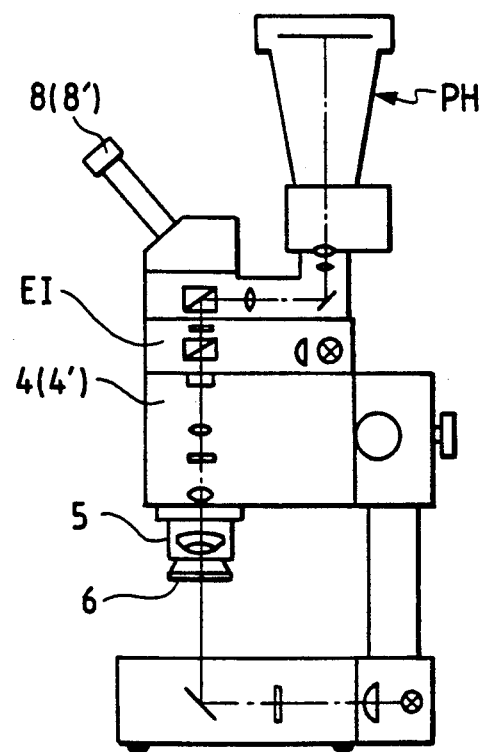
FIG. 2 is a sectional view illustrating an example of configuration of the conventional systemized stereomicroscope comprising the vertical illumination systems.
Figure 3A:
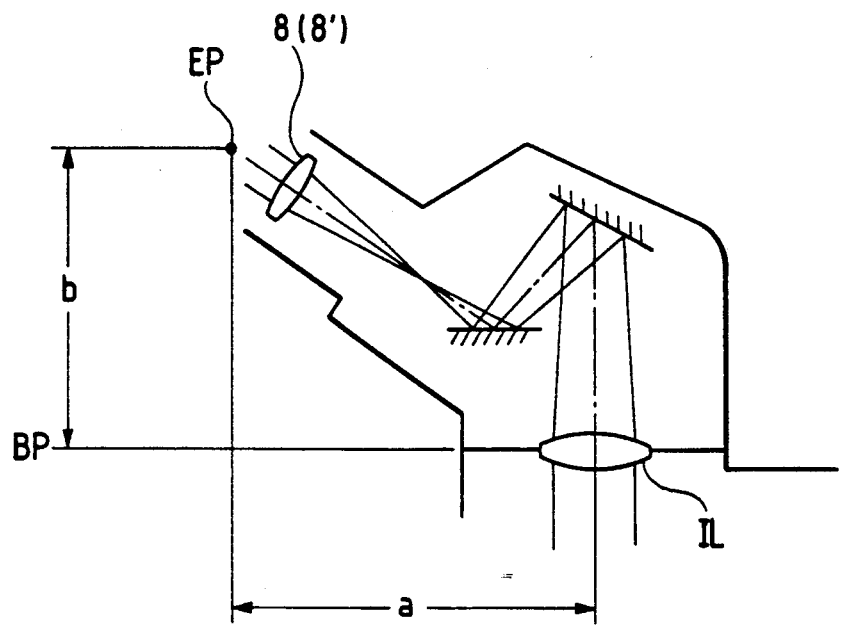
FIG. 3A is a vertical sectional view illustrating an example of configuration of an ordinary type eyepiece tube used in the conventional stereomicroscope.
Figure 3B:
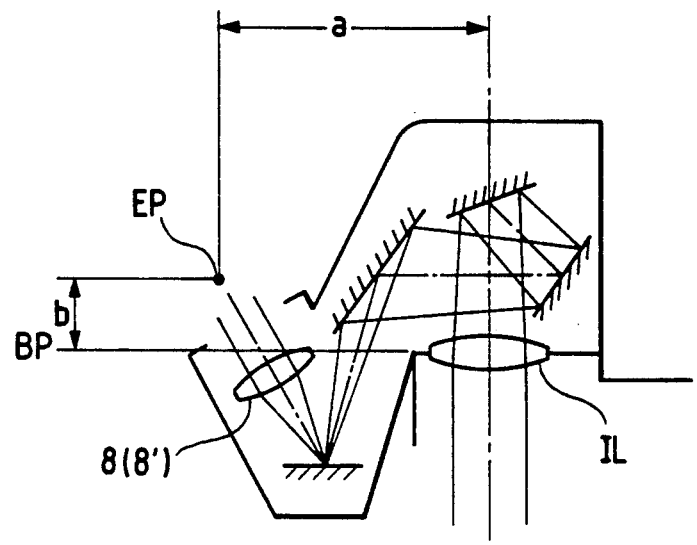
FIG. 3B is a vertical sectional view illustrating an example of configuration of an eyepiece tube which is configured so as to permit modifying an optical path in the conventional stereomicroscope.
Figure 4A:
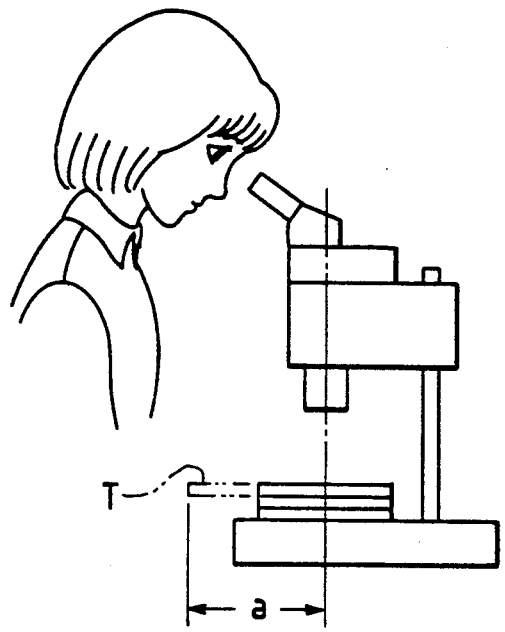
FIG. 4A is a side view illustrating an example of the conventional stereomicroscope which is equipped with a large sample stage.
Figure 4B:
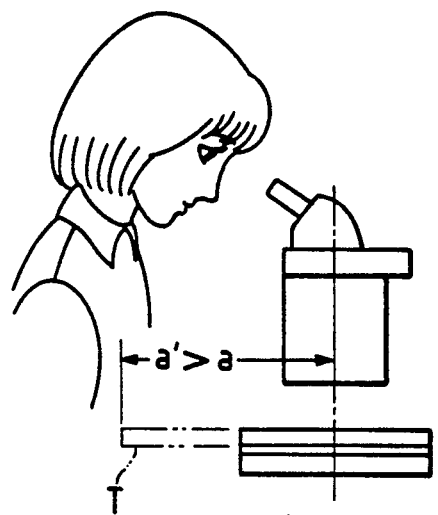
FIG. 4B is a side view illustrating another example of the conventional stereomicroscope which is equipped with a large sample stage.
Figure 7A:
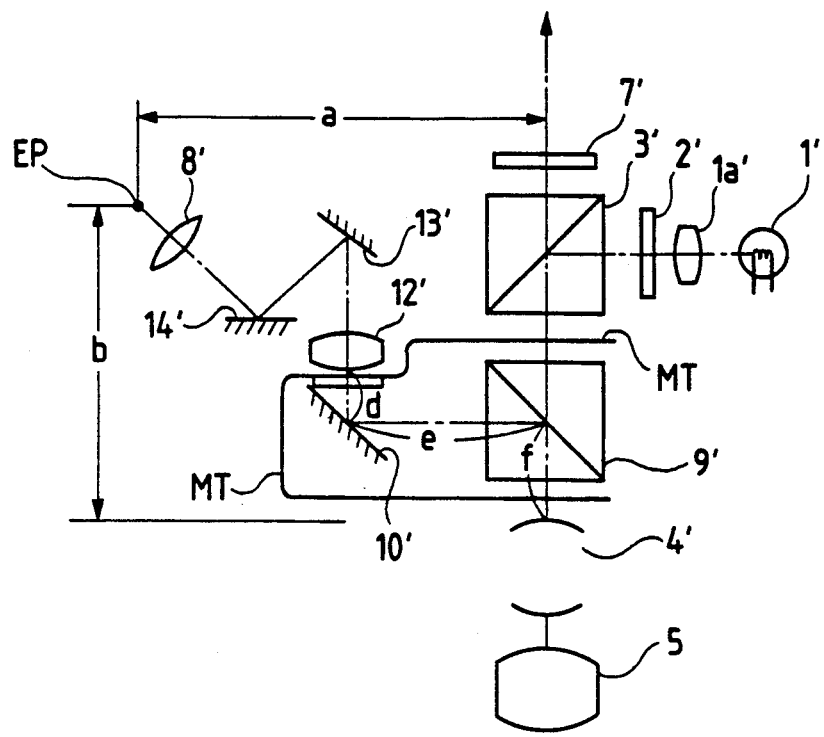
FIG. 7A is a sectional view illustrating main members of the stereomicroscope according to the present invention.

The stereomicroscope according to the present invention has the configuration described above. Location of the eye point of the stereomicroscope will be described below while comparing it with that of the microscope disclosed by the prior art No. 2 (FIG. 2). For simplicity of description, let us assume that the analyzer 20 is removed and that the coaxial vertical illumination unit EI does not comprise the light beam contracting-relaying system. According to the present invention, disposed between the objective lens 5 and the beam splitters 3, 3' are optical path switching means 9, 9' which make it possible to form optical paths for transmitting images in the direction perpendicular to the optical axis of the objective lens 5 from between the coaxial vertical illumination unit EI and the variable magnification systems 4, 4'. That is to say, light beams reflected by the sample S are linearly polarized in the direction perpendicular to the light beam which is emitted from the light source 1 and polarized for illumination, pass through the objective lens 5 and the variable magnification systems 4, 4', and reach the polarizing light beam splitters selected as the optical path switching means 9, 9'. The light beams are reflected by the polarizing beam splitters in the direction perpendicular to the optical axis of the objective lens 5, further reflected by the mirrors 10, 10' arranged at the ends of the universal intermediate tube unit MT, and are incident on the imaging lenses 12, 12' disposed in the eyepiece tube units ET, ET'. Since the light beams reflected by the sample S are led to the eyepiece lenses 8, 8' of the eyepiece tube units ET, ET' through the universal intermediate tube unit MT as described above, the stereomicroscope according to the present invention permits reserving a sufficiently long horizontal distance as measured from the eye point EP thereof to the optical axis of the objective lens 5 and shortening a vertical distance b (see FIG. 7A). Though FIG. 7 shows only the left side half of FIG. 6, the sufficiently long horizontal direction can be reserved and the vertical distance can be shortened in the similar manner also in the right side half of FIG. 6.

Figure 7B:
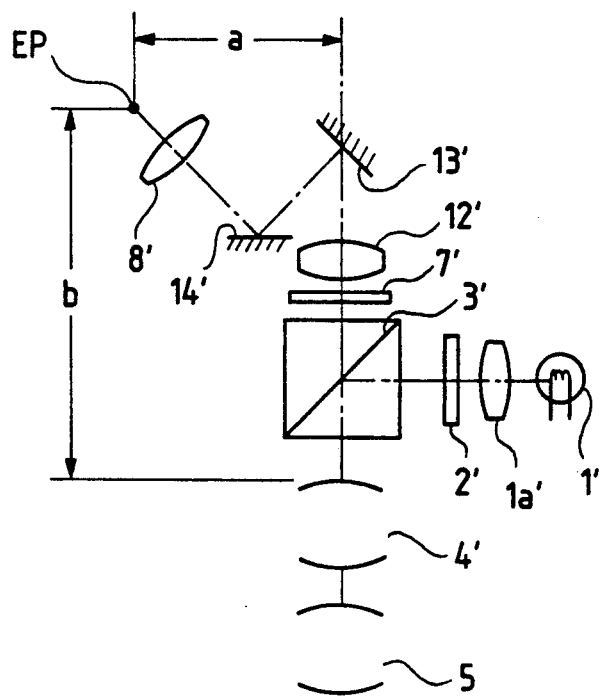
FIG. 7B is a sectional view illustrating main members of the conventional stereomicroscope selected as an example for comparison with those of the stereomicroscope according to the present invention.
Figure 8A:
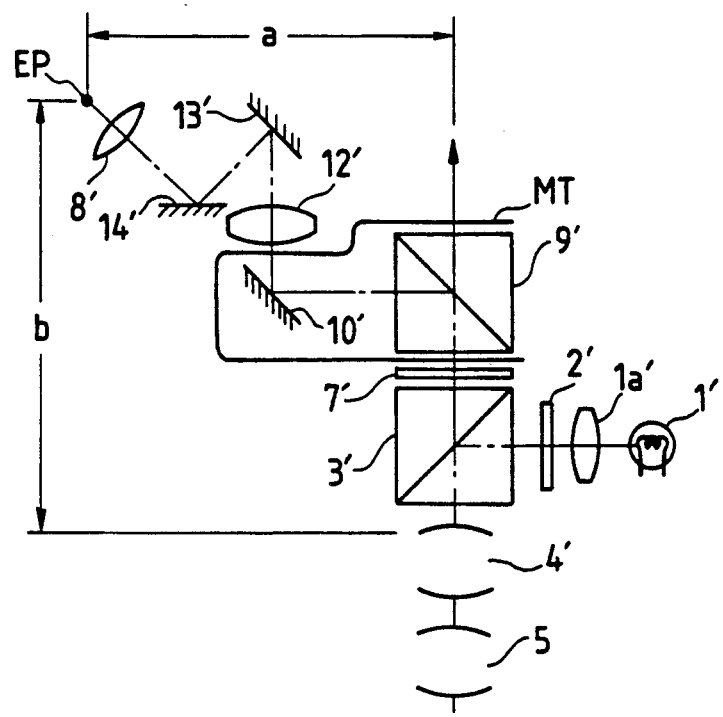
FIG. 8A is a sectional view illustrating an example of configuration of the conventional stereomicroscope which is equipped with the universal intermediate tube unit to be used in the stereomicroscope according to the present invention and selected as an example for comparison with the stereomicroscope according to the present invention.
Figure 8B:
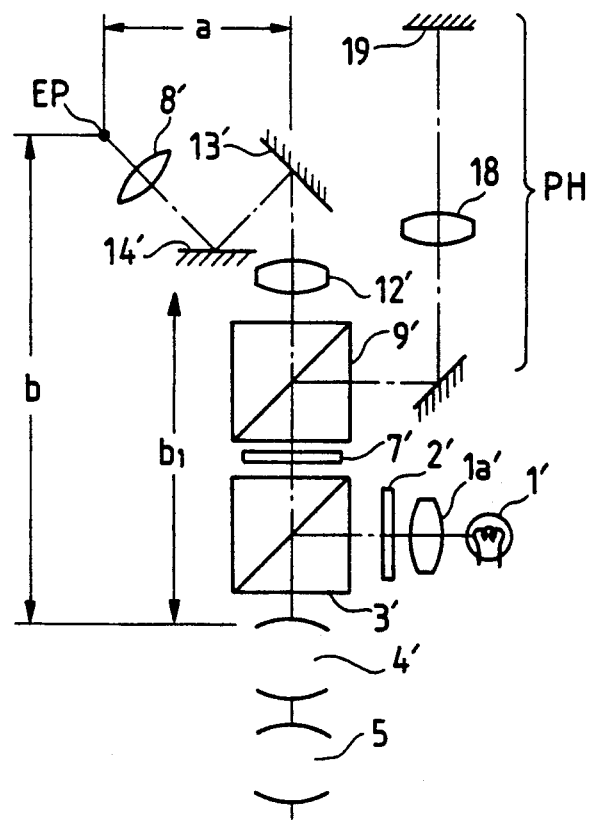
FIG. 8B is a sectional view illustrating an example of configuration of an ordinary microscope incorporating a photographing unit.

FIG. 7B exemplifies a case wherein an eyepiece lens is disposed on the top of the microscope body with the photographic optical system removed from the first optical system I or the second optical system II of the microscope according to the prior art No. 2. In this case, the horizontal distance a is short and the vertical distance b is long as shown in FIG. 7B. In contrast, the microscope according to the present invention makes it possible to prolong the horizontal distance a to the eye point thereof and shorten the vertical distance b as described above, thereby obliging the microscopist to take no unnatural posture and greatly facilitating observing works. In case of the configuration shown in FIG. 7B, the microscope permits only observation through the eyepiece lens 8' but cannot be equipped with the photographic unit PH, etc., thereby being poor in systematization and low in commercial value. When this microscope is equipped with the universal intermediate tube MT to be used in the stereomicroscope according to the present invention, in contrast, the horizontal distance a to the eye point EP thereof is relatively long but the vertical distance b is also prolonged as shown in FIG. 8A. Further, when the microscope according to the prior art No. 2 is equipped with the photographic unit PH, etc. as shown in FIG. 8B, the vertical distance b to the eye point EP thereof is inevitably prolonged remarkably. The stereomicroscope according to the present invention permits setting the eye point EP thereof at a location very convenient for observation and composing highly systemized microscope system as described above. Though the reference symbols and numerals are used for the members disposed only in the left side half of the microscope system also in the description given above, the stereomicroscope according to the present invention should not be limited to the left side half in understanding the present invention.

Now, description will be made of the field number. In order to reserve a large field number in the cases of the microscopes shown in FIGS. 7A, 7B and FIGS. 8A and 8B, a distance as measured between the variable magnification lens 4' and the imaging lens 12' must be shortened. Let us consider a distance which is measured from the variable magnification lens 4' to the imaging lens 12' and permits reserving a certain field number in the microscope having the configuration shown in FIG. 8B including the photographic unit PH, and represent this distance as a vertical distance $b_1$. When this vertical distance $b_1$ is applied to the stereomicroscope according to the present invention as shown in FIG. 7A, the vertical distance $b_1$ is nearly equal to $(d+e+f)$. Therefore, the stereomicroscope according to the present invention is not inferior in the field number to the microscope according to the prior art No. 2.

Figure 5:
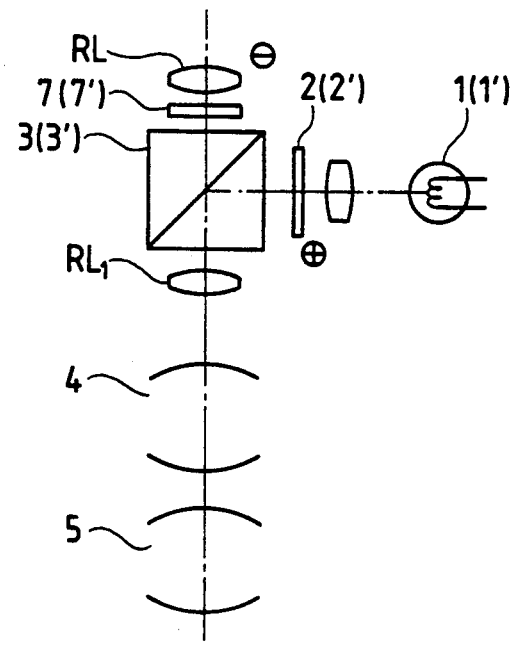
FIG. 5 is a sectional view illustrating an example of configuration of a coaxial vertical illumination unit which is configured so as to contract and relay a ligh beam in the conventional stereomocroscope.
Figure 9A:
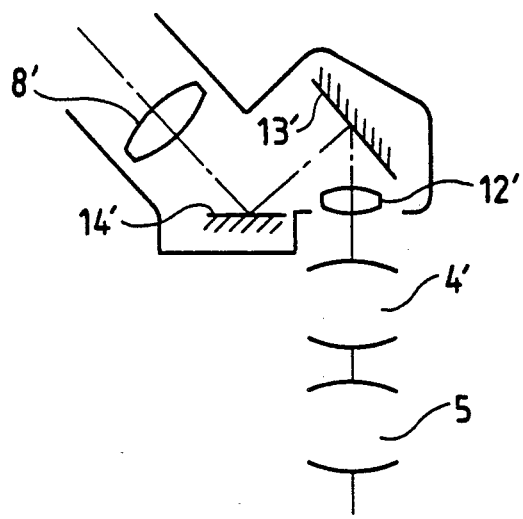
FIG. 9A is a sectional view illustrating an example of system configuration of the stereomicroscope according to the present invention when it is set for observation in the transmission mode with the coaxial vertical illumination unit removed.
Figure 9B:
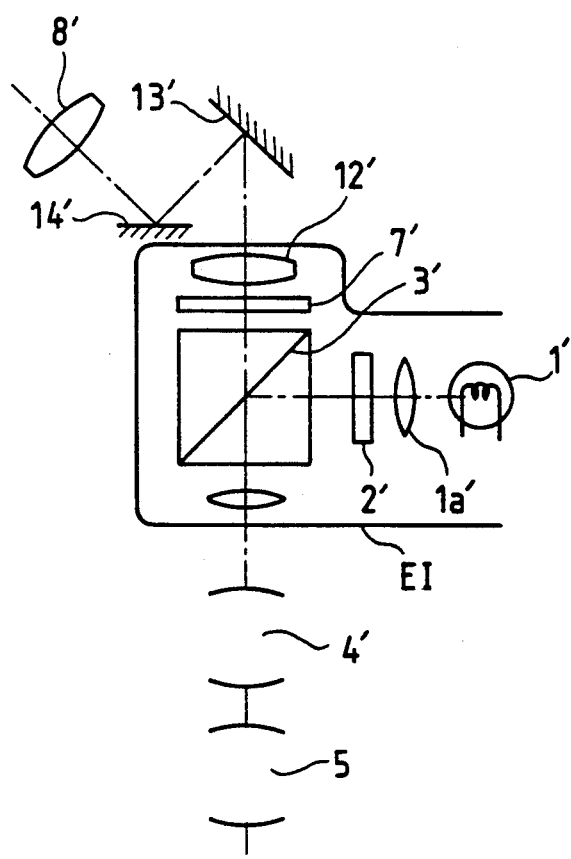
FIG. 9B is a sectional view illustrating an example of system configuration of the stereomicroscope according to the present invention when it is set for observation in the transmission mode with the coaxial vertical illumination units mounted in position.
Figure 13A:
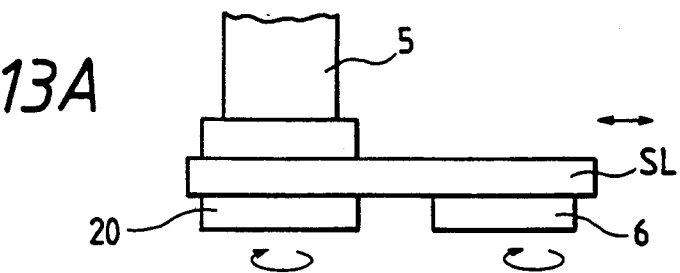
FIG. 13A is a sectional view illustrating an example of system configuration of the stereomicroscope according to the present invention wherein a slider equipped with a polarizer and a quarter wavelength plate is disposed under the objective lens.
Figure 13B:
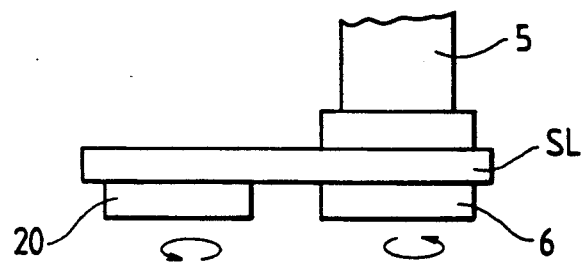
FIG. 13B is a sectional view illustrating an example of system configuration of the stereomicroscope according to the present invention wherein the quarter wavelength plate of the slider is interposed in the optical path.

On the other hand, an intermediate image is vignetted when the stereomicroscope is equipped with the photographic unit PH as shown in FIG. 8B to prevent the imaging lens, prism, etc. from being enlarged. In order to avoid the vignetting, the light beam contracting-relaying lenses are disposed before and after the coaxial vertical illumination unit as described above (see FIG. 5). However, the use of the light beam contracting-relaying lenses poses a problem that observing magnification of the microscope is changed by mounting or removing the coaxial vertical illumination unit even when the eyepiece tubes remain unchanged as shown in FIG. 9A and FIG. 9B. FIG. 9A shows a case wherein the microscope is set for illumination in the transmission mode without employing the coaxial vertical illumination unit, whereas FIG. 9B shows another case wherein the microscope is set for illumination in the transmission mode with the coaxial vertical illumination unit mounted in position. In contrast, observing magnification of the stereomicroscope according to the present invention is not changed by switching between the coaxial vertical illumination unit EI and the illumination unit TI in the transmission mode since the light beam contracting-relaying lenses are not disposed in the optical paths for observation. In the description made above also, the reference symbols and numerals are given only to the members disposed in the left side half of the microscope, but the stereomicroscope should not be limited to the left side half in understanding the present invention.

Description will be further made of the switching between the observation in the coaxial vertical illumination mode and that in the transmission illumination mode. For example, when the observation in the transmission illumination mode is to be performed with the coaxial vertical illumination unit EI mounted in position, there is posed a problem that light quantity is always lowered to approximately 30% due to the polarizer 7' and the beam splitter 3' which are set in position. Though it is conceived for solving this problem to remove the polarizer 7' and the beam splitter 3' from the optical path, it is practically impossible to remove these members since such removal causes change of the optical path length between the two lenses arranged before and after the beam splitter 3'. In the stereomicroscope according to the present invention in which the polarizing beam splitter adopted as the optical path switching means 9' is selectively removable from the optical path in the universal intermediated tube, in contrast, light quantity is not lowered for the observation in the coaxial vertical illumination mode nor that in the transmission illumination mode since the polarizing beam splitter is disposed in the optical path as the optical path switching means 9' for the observation in the coaxial vertical illumination mode and removed from the optical path for the observation in the transmission illumination mode.

Further, it is conceived, for the microscope according to the prior art No. 1 (FIG. 1), to dispose a polarizer 22 on the side of the light source 2 of the sample S as shown in FIG. 6 for the observation in the transmission-polarization mode. But the microscope does not permit adequate observation even with the polarizer 22 since a polarized light beam emitted from the sample S is further polarized due to manufacturing errors, assembling errors, deformation, curvature, etc. of the objective lens 5 and the variable magnification lens 4', and then is observed in a condition where it is polarized only in one direction by the analyzer. For correct observation in the transmission-polarization mode, it is therefore necessary to remove the coaxial vertical illumination unit and dispose the analyzer 20 before the objective lens 5. On the other hand, the stereomicroscope according to the present invention permits correct observation without removing the coaxial vertical illumination unit simply by disposing the polarizer 22 on the light source side of the sample S, exchanging the polarizing beam splitters adopted as the optical path switching means 9, 9' with mirrors or half mirrors in the universal intermediate tube, removing the polarizers 11, 11' from the optical path of the universal intermediate tube unit MT, and replace the quarter wavelength plate 6 with the analyzer 20 before the objective lens 5.

The stereomicroscope according to the present invention is constructed to permit disposing additional beam splitters as the optical path switching means 9, 9' under the polarizing beam splitters 3, 3' (on the side of the objective lens 5) which are disposed in the coaxial vertical illumination unit as already described above. Description will be made of an improving measure which is taken by the present invention for solving the problem of the insufficient quantity of illumination light posed by disposing the polarizing beam splitters at the two stages. In the universal intermediate tube unit MT, half mirrors, polarizing beam splitters, mirrors and empty holes can be disposed selectively as the optical path switching means 9, 9'. Let us take as an example a case wherein observation is to be performed in the coaxial vertical illumination mode while the polarizing beam splitters adopted as the optical path switching means 9, 9' are disposed in the universal intermediate tube unit MT as exemplified in FIG. 10A. In this case, let us assume that the polarizing beam splitter selected as the optical path switching means 9 is disposed so as to have an optical axis (or a reflecting surface) perpendicular to that of the polarizing beam splitter 3 which is arranged in the coaxial vertical illumination unit. As shown in FIG. 11, a light beam emitted from the light source 1 is reflected by two mirrors, polarized by the polarizer 2 into S polarized component (polarized in the x direction only), reflected by a reflecting surface a of the polarizing beam splitter 3 (this reflecting surface a has a property to reflect S component which is perpendicular to the reflecting direction thereof but allows to pass therethrough P component which is in parallel with the reflecting direction) and reaches the polarizing beam splitter selected as the optical path switching means 9. Since the polarized light beam incident on the polarized beam splitter 9 is the P component, it passes through a reflecting surface b of this polarized beam splitter, circularly polarized while transmitting through the quarter wavelength plate 6, and illuminates the sample S in a circularly polarized condition. The light beam is reflected by the sample S and linearly polarized in the direction perpendicular to the original direction thereof and reaches the polarized beam splitter 9. In this case, almost all of the light beam emitted from the light source 1 is allowed to pass to the side of the eyepiece since the light beam is the S component relative to the reflecting surface b of the polarizing beam splitter 9. The problem of the insufficient quantity of the illumination light can be solved completely by disposing the polarizing beam splitters at the two stages.

When it is desired to perform observation with a larger quantity of illumination light in the transmission illumination mode, on the other hand, a mirror is selected as the optical path switching means 9 as shown in FIG. 10B so that the mirror 9 reflects a light beam emitted from the light source for the transmission illumination mode and almost all the light beam emitted from the light source 21 for the transmission illumination mode can be allowed to pass to the side of the eyepiece. Further, when it is desired to perform observation and photographing simultaneously in the transmission illumination mode or in the coaxial vertical illumination mode, half mirrors are selected as the optical path switching means 9, 9' as shown in FIG. 10C. Speaking more concretely, the observation and photographing in the transmission illumination mode can be performed at the same time by igniting a light source 21 for the transmission illumination mode and divide the light beam emitted from the light source 21, for example at a ratio of 1:1, by the half mirror 9 into the optical systems located on the side of the eyepiece tube unit ET and the side of the photographing unit PH respectively. For the observation in the coaxial vertical illumination mode, in contrast, 50% of a light beam emitted from the light source 1 is allowed to transmit through the half mirror 9 toward the objective lens 5, whereas the rest 50% of the light beam is reflected. The light beam allowed to transmit through the half mirror 9 is reflected by the sample S and returns again to the half mirror 9. The light beam which has returned to the half mirror 9 is divided, at a ratio of 1:1, and led into the optical systems located on the side of the coaxial vertical illumination unit EI and the side of the eyepiece tube unit ET respectively, whereby 25% of the light beam emitted from the light source 1 (50% of the image light) is used for each of the observation and photographing. Accordingly, it is possible also in this case to perform the observation and photographing at the same time in the coaxial vertical illumination mode. Furthermore, in a particular case where a dark sample is to be observed, it is possible to allow almost 100% of the image light to be led into the photographing optical system and take a bright image of the dark sample by selecting empty holes as the optical path switching means 9, 9' as shown in FIG. 10D (exemplifying a case of observation in the coaxial vertical illumination mode). In the description made above with reference to FIG. 10 and FIG. 11, the reference symbols and numerals are given only to the members arranged in the right side half of the stereomicroscope according to the present invention, but the stereomicroscope should not be limited to the right side half in understanding the present invention.

It is possible to compose optical systems suited for various modes of application by selecting different members as the optical path switching means 9, 9' in the universal intermediate tube unit MT as described above. FIG. 12 illustrates an additional example wherein two eyepiece tube units ET, ET' are mounted on the universal intermediate tube unit with the TV photo-unit PH and the coaxial vertical illumination unit EI removed. In other words, the stereomicroscope according to the present invention allows two microscopists to observe an image simultaneously through the eyepiece tube unit ET which is disposed in the optical path of the objective lens 5 and the eyepiece tube unit ET' which is disposed in the optical path perpendicular to the optical path of the objective lens 5 when a half mirror is selected as the optical path switching means 9'.

Moreover, it is possible, by selecting and fixing half mirrors as the optical path switching means 9, 9', to configure the stereomicroscope according to the present invention so as to permits three microscopic modes, i.e., observation in the coaxial vertical illumination mode, observation in the transmission illumination mode and observation in the transmission-polarization mode, and obtain a universal intermediate tube unit which is convenient for use and can be manufactured at a low cost. The three microscopic modes mentioned above can be switched quickly from one to another or a stereomicroscope featuring high operability can be obtained especially by disposing, under the objective lens 5, a slider SL on which the analyzer 20 and the quarter wavelength plate 6 are rotatably mounted so that these members can be selectively set in the optical path, and setting and removing the polarizers 11, 11' into and out of the optical path in the universal intermediate tube unit MT in conjunction with the selection of the analyzer 20 and the quarter wavelength plate 6.

Figure 14:
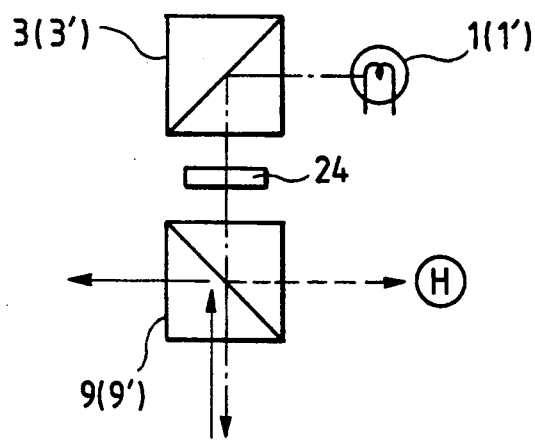
FIG. 14 is a plan view illustrating an example of system configuration of the stereomicroscope according to the present invention wherein two polarizing beam splitters are disposed in such directions as to set reflecting plates thereof perpendicular to each other.

FIG. 14 exemplifies a configuration of the stereomicroscope according to the present invention wherein the beam splitter 3 (3') is disposed in the coaxial vertical illumination unit EI so as to have a reflecting surface perpendicular to that of the polarizing beam splitter selected as the optical path switching means 9 (9') and the light source 1 is arranged on the side of the reflecting surface of the polarizing beam splitter 3 (3'). If the reflecting surfaces of the polarizing beam splitters are set at 180° relative to each other, the illumination light would be reflected in the direction indicated by (H) in FIG. 14 due to the basic property of the polarizing beam splitters when the half wavelength plate 24 is not set in the optical path. This configuration wherein the reflecting surfaces of the polarizing beam splitter 3 (3') and the polarizing beam splitter selected as the optical path switching means 9 (9') are perpendicular to each other makes it possible to perform proper observation and simplify the configuration of the stereomicroscope according to the present invention.

What is claimed is:

1. A stereomicroscope permitting microscopy in a coaxial vertical illumination mode comprising:
   a pair of observation systems having the same optical configuration, and each comprising an objective lens and an eyepiece lens,
   a pair of light source means disposed above said objective lens for emitting illumination light beams through first polarizing beam splitters into said observation systems so as to be coaxial therewith,
   two pairs of polarizers disposed on the side of said eyepiece lenses and on the side of said light source means respectively so as to have polarizing directions perpendicular to each other, and
   a quarter wavelength plate interposed in an optical path between said objective lens and a sample to be observed;
   wherein said stereomicroscope further comprises a pair of light beam deflecting means capable of being selectively interposed in optical paths between said first polarizing beam splitters and said objective lens, each of said polarizers disposed on the side of said eyepiece lenses is removably disposed in an optical path deflected by each of said light beam deflecting means, and a pair of eyepiece tubes including said eyepiece lenses are arranged with the polarizer disposed on the side of the eyepiece lenses interposed between said eyepiece tubes and an intermediate tube containing said pair of light beam deflecting means and said pair of polarizers disposed on the side of said pair of eyepiece lenses.

2. A stereomicroscope according to claim 1 wherein said pair of light beam deflecting means and said pair of polarizers disposed on the side of the eyepiece lenses are composed as a unit, said eyepiece tubes are attached to portions of said unit located on the side of the optical paths deflected by said light beam deflecting means, and attachable to said unit are a coaxial vertical illumination unit comprising said pair of light source means and said pair of first beam splitters, a photographing tube and another eyepiece tube.

3. A stereomicroscope according to claim 1 wherein said light beam deflecting means are second polarizing beam splitters, mirrors or half mirrors.

4. A stereomicroscope according to claim 1 wherein said light beam deflecting means are half mirrors.

5. A stereomicroscope according to claim 1 further comprising a slider disposed between said objective lens and said sample, and capable of interposing said quarter wavelength plate and a second polarizer removably into the optical path.

6. A stereomicroscope according to claim 1 further comprising a slider disposed between said objective lens and said sample, and capable of interposing said quarter wavelength plate or a second polarizer selectively into the optical path.

7. A stereomicroscope according to claim 3 wherein said first polarizing beam splitters have reflecting surfaces perpendicular to those of the second solarizing beam splitters which correspond to said first solarizing beam splitters respectively, and said light source means are disposed opposite to the reflecting surfaces of said first polarizing beam splitters.

8. A stereomicroscope permitting microscopy in a coaxial vertical illumination mode comprising:
a pair of observation systems having the same optical configuration, and each comprising an objective lens and an eyepiece lens,
light source means disposed above said objective lens for emitting illumination light beams through first polarizing beam splitters into said observation systems so as to be coaxial therewith,
two pairs of polarizers disposed on the side of said eyepiece lenses and on the side of said light source means respectively so as to have polarizing directions perpendicular to each other, and
a quarter wavelength plate interposed in an optical path between said objective lens and a sample to be observed;
wherein said stereomicroscope further comprises a pair of optical path switching means disposed in optical paths between said first polarizing beam splitters and said objective lens, each of said polarizers disposed on the side of said eyepiece lenses is removably disposed in an optical path switched by each of said optical path switching means, and a pair of eyepiece tubes including said eyepiece lenses are arranged with the polarizer disposed on the side of the eyepiece lenses interposed between said eyepiece tubes and an intermediate tube containing said pair of optical path switching means and said pair of polarizers disposed on the side of said pair of eyepiece lenses.

9. A stereomicroscope according to claim 8 wherein said pair of optical path switching means and said pair of polarizers disposed on the side of the eyepiece lenses are composed as a unit, said eyepiece tubes are attached to portions of said unit located on the side of the optical paths switched by said optical path switching means, and attachable to said unit are a coaxial vertical illumination unit comprising said light source means and said pair of first beam splitters, a photographing tube and another eyepiece tube.

10. A stereomicroscope according to claim 8 wherein said optical path switching means are light beam deflecting means or empty holes.

11. A stereomicroscope according to claim 10 wherein said light beam deflecting means are second polarizing beam splitters, mirrors or half mirrors.

12. A stereomicroscope according to claim 8 further comprising a slider disposed between said objective lens and said sample, and capable of interposing said quarter wavelength plate and a second polarizer removably into the optical path.

13. A stereomicroscope according to claim 8 further comprising a slider disposed between said objective lens and said sample, and capable of interposing said quarter wavelength plate or a second polarizer selectively into the optical path.

14. A stereomicroscope according to claim 11 wherein said first polarizing beam splitters have reflecting surfaces perpendicular to those of the second polarizing beam splitters which correspond to said first polarizing beam splitters respectively, and said light source means is disposed between the reflecting surfaces of said first polarizing beam splitters.

* * * * *